June 18, 1935.  B. MILNER  2,005,554

ARTIFICIAL BAIT OR FISH LURE

Filed Nov. 2, 1933

INVENTOR
BERTRAM MILNER,
BY Joseph A. Rave.
ATTORNEY

Patented June 18, 1935

2,005,554

UNITED STATES PATENT OFFICE 2,005,554

ARTIFICIAL BAIT OR FISH LURE

Bertram Milner, St. Bernard, Ohio

Application November 2, 1933, Serial No. 696,345

10 Claims. (Cl. 43—42)

This invention relates to improvements in artificial fish bait or fish lures and particularly to the submerged types of said articles.

The principal object of this invention is the provision of such a lure that very nearly resembles live water animals which is the natural food of the fish.

Another object of this invention is the provision of an improved fish lure which when being drawn through the water shifts and darts relative thereto in such a manner as to very closely resemble the movements of the water animals which are the natural food of the fish.

A further object of the present invention is the provision of an artificial bait or fish lure that will accomplish the above objects but will have sufficient weight for casting and the like.

A still further object of this invention is the provision of an artificial bait or fish lure that will accomplish the above objects and, in which, while shifting and darting through the water in simulation of a live bait's movement, will be prevented from making complete revolutions about the axis of the fishing line and thereby prevent a twisting of said line.

Other objects and advantages of the present invention should be readily apparent by reference to the following specification taken in conjunction with the accompanying drawing, and it should be understood that any modification may be made in the exact structural details there shown and described within the scope of the appended claims without departing from, or exceeding the spirit of, the invention.

In the drawing.

Throughout the several views of the drawing similar reference characters are employed to denote the same or similar parts.

Figure 1:
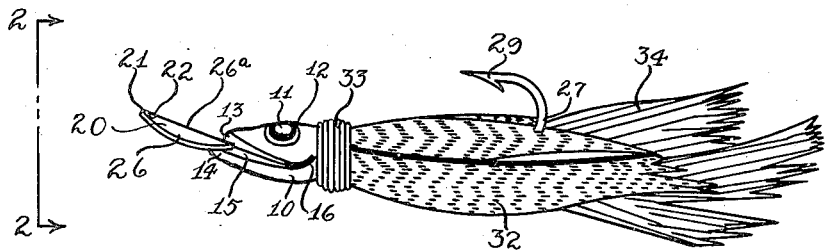
Figure 1 is a side elevational view of the improved artificial bait or fish lure.
Figure 2:
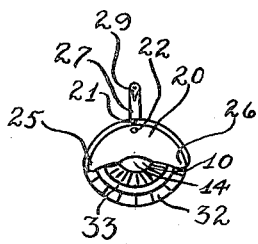
Figure 2 is an end elevational view of the lure illustrated in Figure 1 as particularly seen from the line 2—2 of Figure 1.

The artificial bait or fish lure of the present invention comprises a body portion 10 in the form of a head of some water animal which is the natural food for fish and the like. The particular form chosen for illustrative purposes is the head of a small fish or minnow, but it is to be understood that the invention is not limited to this form. This head or body portion 10 is made of a relatively heavy metal and preferably cast of one of the lead compounds which includes a relatively large amount of tin so as to be fairly tough and will therefore not readily be cut by rocks and the like on the bed of the water. Cast into the body 10 are the eyes 11 which in the finished form are painted a color contrasting with the color of the body. From the eyes 11 or crown 12 of the head, the body portion of the bait is somewhat conical in shape and terminates in the lips 13 and 14. It will be noted that the lower lip 14 protrudes considerably ahead of the upper lip 13 and the purpose therefor will be described later.

On each side of the body portion is a groove 15 which represents the mouth of the fish head. This groove or mouth extends backwardly and downwardly from the lips and terminates in an upward curve 16. This groove is of an appreciable depth and assists in effecting the life like movements of the lure as will later be made clear.

Figure 3:
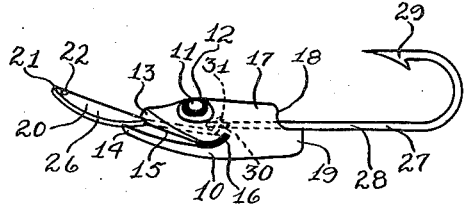
Figure 3 is a side elevational view of the improved device of this invention prior to the attaching thereto of the body and tail feathers.

The body portion 17 from the eyes 11 or crown 12 extends rearwardly at a very slight angle and has a cross section somewhat ovate. As will be seen from Figure 3 this portion 17 of the lure terminates in a blunt end 18 for the upper half and has the lower half extended well beyond the blunt end 18 as shown at 19.

Figure 4:
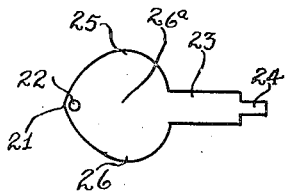
Figure 4 is a plan view of the improved mouth piece of this invention and forming a detail of the invention.

Projecting from between the lips 13 and 14 is a mouth piece 20 preferably formed from a flat piece of non-corrosive material. As will be seen from Figure 4 the mouth piece 20 is somewhat spade shaped and terminates at one end in a substantial point 21 through which is pierced a hole 22 for attaching the lure to the fishing line. At its other end the mouth piece is integral with a shank 23 which terminates in a tongue 24. The lateral sides 25 and 26 of the mouth piece are adapted to be turned down thereby giving the mouth piece a transverse curve with the portion of the mouth piece between the lateral sides 25 and 26 substantially plane as at 26a. It will further be noted that the said plane of the mouth piece is substantially a continuation of the mouth or mouth grooves 15.

Projecting from the rear of the body portion 17 is the usual hook 27 having the axis of its shank disposed slightly above the axis through the lure as a whole. The barbed end 29 of the hook turns upwardly and overlies the lure as a whole. The inner end of the hook shank 28 is provided with the usual eye 30 indicated by dotted line in Figure 3. This eye receives the tongue 24 of the mouth piece 20 which is turned upwardly to form a hook also shown in dotted line at 31 in Figure 3. In practice the mouth piece 20 and hook 27 are assembled by inserting the tongue 24 of the mouth piece through the eye of the hook and these parts are then placed in a mold. The entire lure body 10 is then poured around the joint of the hook with the mouth piece. The completed lure has only the spade portion of the mouth piece projecting from the lure and the major portion of the fish hook shank 28. From this it will be seen that in final form the lure is of a substantially unitary construction so that there is no opportunity for the parts to be separated in the event an obstruction, snag or the like is encountered during the retrieving of the lure. At the same time centrifugal force due to casting will in no wise jar or loosen the parts, thereby indefinitely prolonging the life of the lure.

Surrounding the body portion 17 of the lure from a point just behind the crown and substantially encircling the hook 27 are feathers 32 which when wet cling to one another to form the body of the minnow or the like which the lure is simulating. The barbed end 29 of the hook, however, is exposed above the said body feathers 32. The body feathers 32 are attached to the lure body 10 by means of a collar 33 formed of string, thread or the like which is wrapped around the ends of the feathers and the lure body a number of times. Additionally, and secured beneath the body feathers 32, are the tail feathers 34 which project beyond the said body feathers 32 and form the tail of the minnow or other animal when in the water.

The operation of the artificial bait or fish lure is as follows. The bait is cast into a body of water and immediately reeled in, while it tends to sink to the bed thereof. As is usual the bait is then continuously reeled in for drawing the lure through the water. This movement of the lure is of course head-on wherefore the water strikes the under surface of the plane portion 26a of the mouth piece causing the lure to plane through the water. This water is engaged by the substantially blunt projecting end of the lower lip 14 causing same to separate and engage in the mouth grooves 15. The mouth grooves 15 as will be seen from the drawing are in a substantially straight line with the plane portion 26a of the mouth piece. The force of the water acting on these grooves has a tendency to cause the lure to dart off to one side. This tendency is picked up and amplified by the down turned ends 25 and 26 of the mouth piece. This darting, semi-rolling and oscillating is effected rapidly first on one side and then on the other giving to the lure a very life like movement.

As was pointed out above, the lower lip 14 projects considerably ahead of the upper lip 13 of the front end of the lure, while projecting beyond the rear or blunt end 18 of the lure is the portion 19. Each of these parts is disposed below the hook and therefore below the major axis of the lure as whole. This additional weight and slightly off center construction combined with the body feathers 32 definitely prevent the complete rotation of the lure while being retrieved and drawn through the water. In the other words this additional weight and body feathers limit the rotation of the lure while darting through the water and thereby prevent a twisting of the line. From this it will be seen that the fish line will at all times be in perfect condition thereby, regardless of the number of times a cast is made, and will prevent a snarl or back lash in the line on subsequent casts as would occur if the lure were rotated while being retrieved. From the foregoing it will also be evident that no auxiliary equipment such as swivels and the like will be necessary between the lure and the line to prevent this twisting of the line thereby eliminating a mechanism that is frequently obnoxious to the fisherman.

It should also be noted that the lure is of a substantially unitary construction and of a material that will not be readily damaged by rock and the like that may be encountered on the bed of a body of water.

What is claimed is:

1. In a fish lure of the class described the combination of a body portion representing the head of a small water animal, the said body portion having formed therealong grooves representing the mouth thereof, a mouth piece projecting from the mouth and having a transverse curve, said mouth piece and mouth grooves cooperating with one another to effect lifelike darts of the lure through the water while being retrieved, and a hook projecting from the body portion at the rear thereof and having its barbed end disposed in a plane above said body portion.

2. In a fish lure of the class described the combination of a body portion representing the head of a small water animal, the said body portion having formed therealong grooves representing the mouth thereof, a mouth piece projecting from the mouth and having a transverse curve, said mouth piece and mouth grooves cooperating with one another to effect lifelike darts of the lure through the water while being retrieved, a hook projecting from the body portion at the rear thereof and having its barbed end disposed in a plane above said body portion, projections extending from each end of the body portion to provide additional weight at the bottom of the lure, and feathers secured to said body portion and substantially encircling the body portion and hook and cooperating with the weighted lower portion of the lure to prevent a complete rotation of the lure about its major axis while planing through the water.

3. In a fish lure of the class described the combination of a hook having a barbed end and an eye, a mouth piece connected with the hook-eye and having an enlarged end, and a cast metal body portion formed around the joint of the mouth piece and hook, thereby forming a substantially homogeneous structure with the barbed end of the hook projecting from one end of the body portion and the enlarged head of the mouth-piece projecting from the other end of the body portion.

4. In a fish lure of the class described the combination of a hook having a barbed end and an eye, a mouth piece connected with the hook-eye and having an enlarged end, and a cast metal body portion formed around the joint of the mouth piece and hook, thereby forming a substantially homogeneous structure with the barbed end of the hook projecting from one end of the body portion and the enlarged head of the mouth piece projecting from the other end of the body portion, said projecting enlarged end of the mouth piece being provided with a transverse curve and having a hole pierced therein for attaching the lure to a fish line.

5. In a fish lure of the class described the combination of a hook having a barbed end and an eye, a mouth piece connected with the hook-eye and having an enlarged end, and a cast metal body portion formed around the joint of the mouth piece and hook, thereby forming a substantially homogeneous structure with the barbed end of the hook projecting from one end of the body portion and the enlarged head of the mouth piece projecting from the other end of the body portion, said projecting enlarged end of the mouth piece being provided with a transverse curve and having a hole pierced therein for attaching the lure to a fish line, and grooves formed in the sides of the body portion cooperating with the transversely curved mouth piece for causing the lure to effect lifelike darts through the water.

6. In a fish lure of the class described the combination of a cast body portion in the form of a minnow head having grooves formed along the sides thereof representing the mouth, lip portions above and below the mouth grooves, and a transversely curved mouth piece projecting from between the lips.

7. In a fish lure of the class described the combination of a cast body portion in the form of a minnow head having grooves formed along the sides thereof representing the mouth, lip portions above and below the mouth grooves, a transversely curved mouth piece projecting from between the lips, a fish hook projecting from the rear end of the body portion and body feathers secured to the body portion and projecting rearwardly therefrom for substantially enclosing the fish hook but permitting the barbed end thereof to be exposed, the lower lip projecting ahead of the upper lip and underlying the mouth piece, and a projection extending from the rear end of the body portion, said projecting lip and rearwardly projecting body portion cooperating to increase the weight of the lower portion of the lure and said increased lower portion of the lure cooperating with the body feathers to prevent a complete rotation of the lure while being retrieved through the water.

8. In a fish lure of the class described the combination of a cast body in the form of a water animal, a fish hook about which the body is cast and having an eye portion and a barbed portion, and a plate member secured to the hook eye, the barbed end of the hook projecting from the rear of the body and the plate member projecting ahead of the body.

9. In a fish lure of the class described the combination of a cast body in the form of the head of a water animal and having grooves extending along each side thereof representing the mouth, a fish hook projecting from the rear of the body and having its barbed end in a plane overlying the body, and a plate member projecting from the forward end of the body and cooperating with the mouth grooves for effecting life like darts and movements of the lure as same is being drawn through the water.

10. In a fish lure of the class described the combination of a cast body member in the form of the head of a water animal and having its major axis extending in the direction of its length along a line representative of the line of movement of the lure as it is being drawn through the water, said body member having a groove formed along each side thereof and representing the mouth a fish hook projecting from the rear of the body member and having its barbed end in a plane overlying the body, a plate ahead of the body member and projecting from said mouth thereof for causing life like darts of the lure in the water as it is being drawn therethrough, and body feathers secured to the body member and substantially enclosing the hook, the greater portion of the weight of the body member being below its major axis so that the same co-operates with the body feathers to prevent a complete rotation of the lure about its major axis while being drawn or retrieved through the water.

BERTRAM MILNER.